(12) United States Patent
Imagawa

(10) Patent No.: US 11,850,540 B2
(45) Date of Patent: Dec. 26, 2023

(54) EXHAUST GAS PURIFICATION FILTER

(71) Applicant: DENSO CORPORATION, Kariya (JP)

(72) Inventor: Hirokatsu Imagawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 141 days.

(21) Appl. No.: 17/507,020

(22) Filed: Oct. 21, 2021

(65) Prior Publication Data
US 2022/0040624 A1 Feb. 10, 2022

Related U.S. Application Data

(63) Continuation of application No. PCT/JP2020/010206, filed on Mar. 10, 2020.

(30) Foreign Application Priority Data

Apr. 24, 2019 (JP) ................. 2019-083121

(51) Int. Cl.
*B01D 46/24* (2006.01)

(52) U.S. Cl.
CPC ... *B01D 46/2429* (2013.01); *B01D 46/24491* (2021.08); *B01D 46/24492* (2021.08); *B01D 2275/30* (2013.01); *B01D 2279/30* (2013.01)

(58) Field of Classification Search
CPC .......... B01D 46/2429; B01D 46/24491; B01D 46/24; B01D 46/492; B01D 2275/30; B01D 2279/30
USPC ...................................................... 55/385.3
See application file for complete search history.

(56) References Cited

U.S. PATENT DOCUMENTS

| | | | |
|---|---|---|---|
| 2002/0189217 A1 | 12/2002 | Ishihara et al. | |
| 2003/0041574 A1 | 3/2003 | Noguchi et al. | |
| 2007/0119135 A1 | 5/2007 | Miao et al. | |
| 2010/0234206 A1* | 9/2010 | Miao ................. | B01D 39/2068 501/83 |

(Continued)

FOREIGN PATENT DOCUMENTS

| | | |
|---|---|---|
| EP | 2 108 434 | 10/2009 |
| JP | 2007-182896 | 7/2007 |

(Continued)

*Primary Examiner* — Robert A Hopkins
*Assistant Examiner* — Qianping He
(74) *Attorney, Agent, or Firm* — Nixon & Vanderhye P.C.

(57) ABSTRACT

An exhaust gas purification filter includes a plurality of cells each extending from an inflow end face to an outflow end face, a porous partition wall forming the cells in a partitioned manner, inflow-side sealing parts sealing openings on an inflow end face side of outflow cells where the exhaust gas flows out, and outflow-side sealing parts sealing openings on an outflow end face side of inflow cells where the exhaust gas flows in. Each of the inflow-side sealing parts has a porosity of less than 60%. The partition wall has a porosity of 60% or more and 70% or less. Assuming a pore size, at which cumulative pore volume is 50% in pore size distribution of the inflow-side sealing parts, is $d50_{Pin}$, and a pore size, at which cumulative pore volume is 50% in pore size distribution of the partition wall, is $d50_B$, the pore size $d50_{Pin}$ is less than 18 μm, and the pore size $d50_B$ is 18 μm or more and 25 μm or less.

8 Claims, 5 Drawing Sheets

(56) References Cited

U.S. PATENT DOCUMENTS

| | | | |
|---|---|---|---|
| 2015/0211397 A1 | 7/2015 | Ishihara | |
| 2017/0232429 A1* | 8/2017 | Aoki | B01J 37/0201 428/117 |
| 2017/0274311 A1 | 9/2017 | Yoshioka et al. | |
| 2017/0274312 A1* | 9/2017 | Yoshioka | B01D 46/82 |
| 2019/0299146 A1* | 10/2019 | Konno | B01D 46/2476 |

FOREIGN PATENT DOCUMENTS

| | | | |
|---|---|---|---|
| JP | 2008100408 A | * | 5/2008 |
| JP | 2012-81415 | | 4/2012 |
| JP | 2015-182950 | | 10/2015 |
| JP | 2017-213518 | | 12/2017 |

* cited by examiner

EXHAUST GAS PURIFICATION FILTER

CROSS-REFERENCE TO RELATED APPLICATION

This application is the U.S. bypass application of International Application No. PCT/JP2020/10206 filed on Mar. 10, 2020 which designated the U.S. and claims priority to Japanese Patent Application No. 2019-083121 filed on Apr. 24, 2019, the contents of both of which are incorporated herein by reference.

TECHNICAL FIELD

The present disclosure relates to an exhaust gas purification filter.

BACKGROUND

Exhaust gas emitted from an internal combustion engine such as a gasoline engine or a diesel engine contains particulate materials called particulate (hereinafter, sometimes referred to as "PM" as appropriate). An exhaust gas purification filter is disposed in an exhaust passage of the internal combustion engine to collect PM in the exhaust gas and purify the exhaust gas.

SUMMARY

An aspect of the disclosure is an exhaust gas purification filter including a plurality of cells each extending from an inflow end face, through which exhaust gas flows in, to an outflow end face, through which the exhaust gas flows out, a porous partition wall forming the cells in a partitioned manner, inflow-side sealing parts sealing openings on a side of the inflow end face of outflow cells, out of which the exhaust gas flows out, among the cells, and outflow-side sealing parts sealing openings on a side of the outflow end face of inflow cells, into which the exhaust gas flows, among the cells, an average of sealing lengths of the inflow-side sealing parts is larger than an average of sealing lengths of the outflow-side sealing parts, where each of the inflow-side sealing parts has a porosity of less than 60%, the partition wall has a porosity of 60% or more and 70% or less, assuming a pore size, at which cumulative pore volume is 50% in pore size distribution of the inflow-side sealing parts, is $d50_{Pin}$, and a pore size, at which cumulative pore volume is 50% in pore size distribution of the partition wall, is $d50_B$, the pore size $d50_{Pin}$ of the inflow-side sealing part is less than 18 μm, and the pore size $d50_B$ of the partition wall is 18 μm or more and 25 μm or less.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
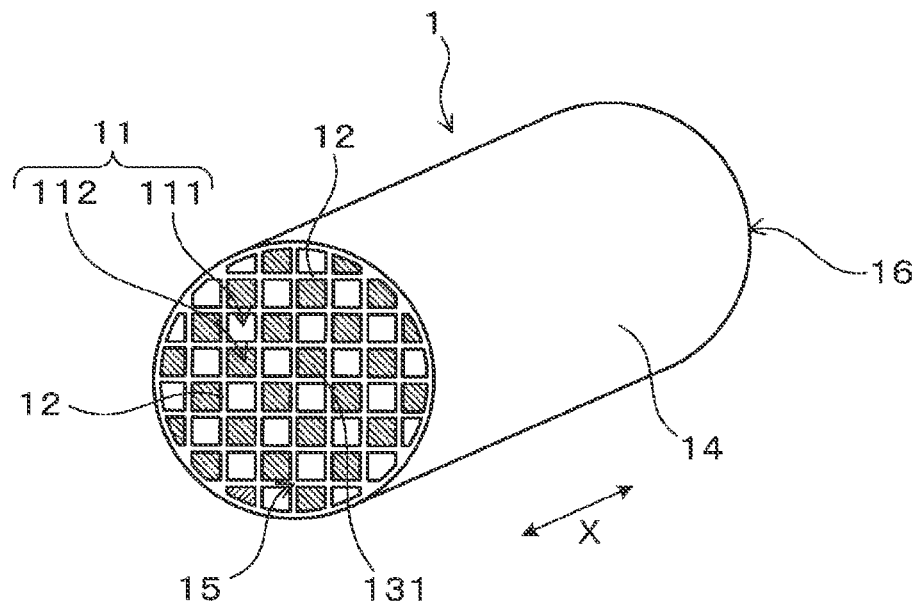
FIG. 1 shows a perspective view of an exhaust gas purification filter according to a first embodiment.

Examples of an exhaust gas purification filter include a diesel particulate filter (hereinafter, sometimes referred to as "DPF") to collect PM emitted from a diesel engine as described in JP 2017-170323 A. JP 2017-170323 A specifically describes DPF in which the average of sealing lengths of outflow-side sealing parts arranged in inflow cells, into which exhaust gas flows, is larger than the average of sealing lengths of inflow-side sealing parts arranged in outflow cells out of which the exhaust gas flows out. In the described DPF, since heat capacity is relatively large on an outflow end face side, even if the collected PM is gradually swept to the outflow end face side of the inflow cells by flow of the exhaust gas, cracking can be suppressed on the outflow end face side during recycling.

The amount of PM emitted from a gasoline engine is extremely smaller than that from a diesel engine. However, since the regulation on number of PM has been introduced, a vehicle having a gasoline engine (hereinafter, "gasoline vehicle") is also required to be equipped with a gasoline particulate filter (hereinafter, sometimes referred to as "GPF" as appropriate) capable of collecting PM emitted from the gasoline engine.

Fuel used in an internal combustion engine typically contains impurities. The impurities contained in the fuel are scattered in a solid form to an exhaust gas purification filter during combustion of the fuel. The gasoline engine has higher temperature and flow rate of the exhaust gas than the diesel engine has. In the gasoline engine, therefore, inflow-side sealing parts arranged on a side of an inflow end face, through which the exhaust gas flows in, tend to be eroded by scattered matter.

An object of the present disclosure is to provide an exhaust gas purification filter capable of suppressing erosion of the inflow-side sealing parts.

An aspect of the disclosure is an exhaust gas purification filter including a plurality of cells each extending from an inflow end face, through which exhaust gas flows in, to an outflow end face, through which the exhaust gas flows out, a porous partition wall forming the cells in a partitioned manner, inflow-side sealing parts sealing openings on a side of the inflow end face of outflow cells, out of which the exhaust gas flows out, among the cells, and outflow-side sealing parts sealing openings on a side of the outflow end face of inflow cells, into which the exhaust gas flows, among the cells, an average of sealing lengths of the inflow-side sealing parts is larger than an average of sealing lengths of the outflow-side sealing parts, where each of the inflow-side sealing parts has a porosity of less than 60%, the partition wall has a porosity of 60% or more and 70% or less, assuming a pore size, at which cumulative pore volume is 50% in pore size distribution of the inflow-side sealing parts, is $d50_{Pin}$, and a pore size, at which cumulative pore volume is 50% in pore size distribution of the partition wall, is $d50_B$, the pore size $d50_{Pin}$ of the inflow-side sealing part is less than 18 μm, and the pore size $d50_B$ of the partition wall is 18 μm or more and 25 μm or less.

The exhaust gas purification filter has the above specific configuration. The exhaust gas purification filter therefore can suppress erosion of the inflow-side sealing parts due to the scattered matter even when used as a GPF.

First Embodiment

An exhaust gas purification filter 1 according to a first embodiment will now be described with reference to FIGS. 1 to 5. A direction of the two-headed arrow shown in FIGS. 1 to 3 is defined as a filter axis direction X of the exhaust gas purification filter 1.

Figure 2:
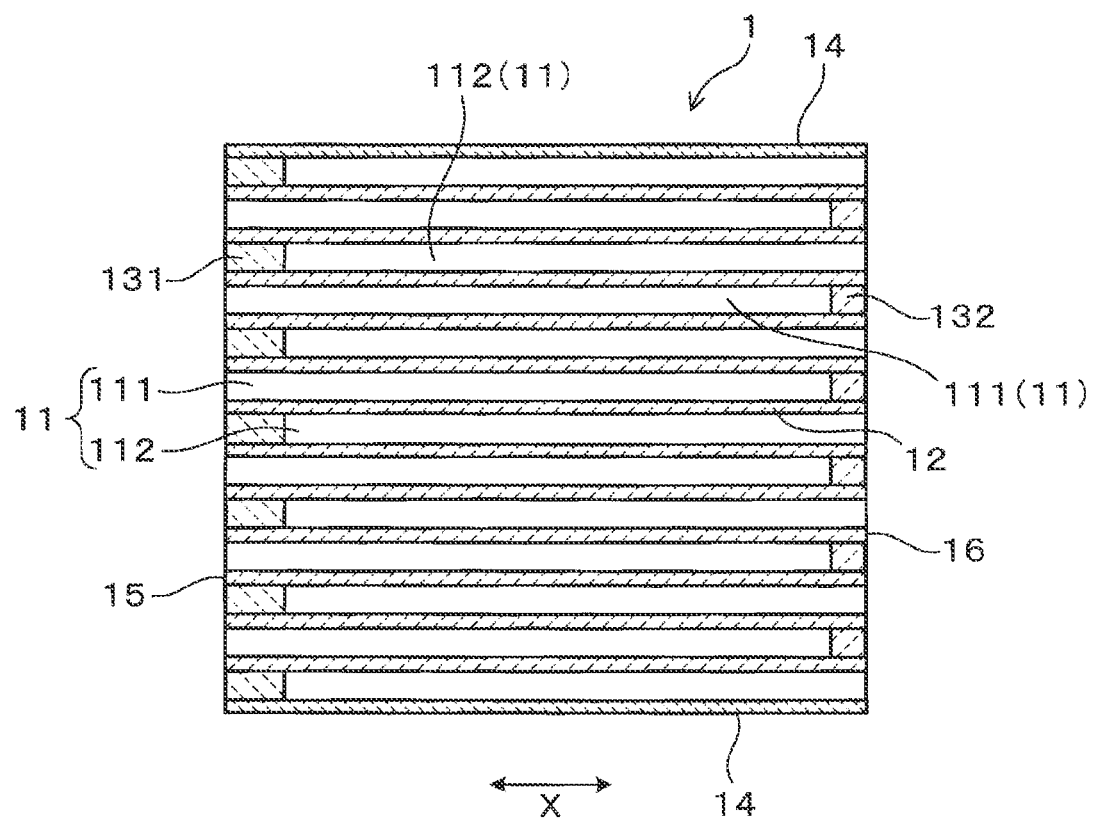
FIG. 2 shows a sectional diagram along a filter axis direction of the exhaust gas purification filter of the first embodiment.
Figure 3:
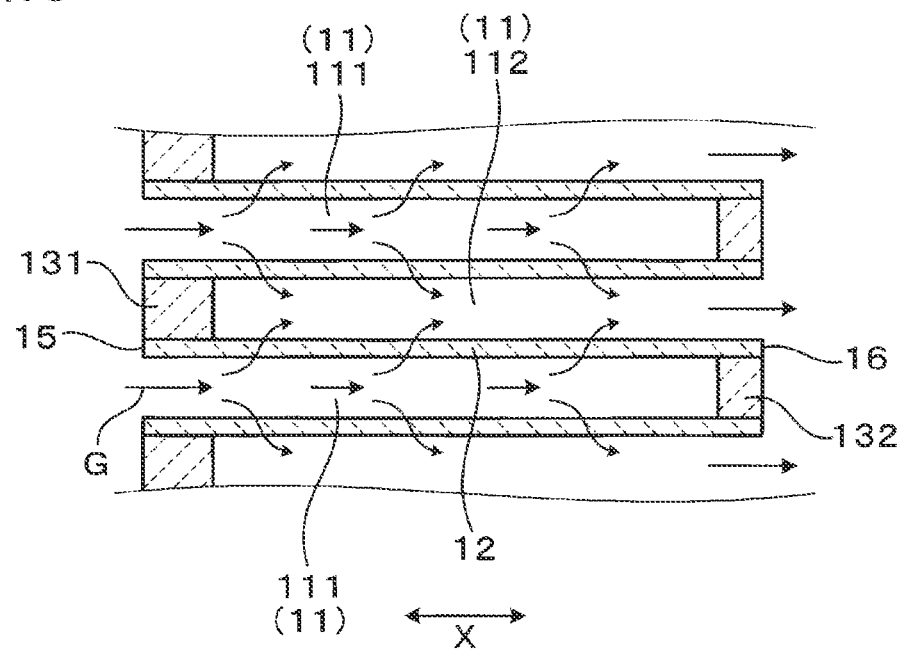
FIG. 3 shows flow of an exhaust gas in the exhaust gas purification filter of the first embodiment.

As shown in FIGS. 1 to 3, the exhaust gas purification filter 1 includes a plurality of cells 11, a partition wall 12, inflow-side sealing parts 131, and outflow-side sealing parts 132.

As shown in FIGS. 1 to 3, the cells 11 each extend from an inflow end face 15, through which exhaust gas G flows in, to an outflow end face 16 through which the exhaust gas G flows out. An extending direction of the cell 11 is typically coincides with the filter axis direction X. As shown in FIG. 1, the cell may have a square shape, for example, in a cross-sectional view perpendicular to the filter axis direction X. The cell shape is not limited to a square shape, but may be another polygonal shape, such as, for example, a triangular shape and a hexagonal shape, or may be a circular shape. Further, the cell shape may be a combination of two or more different shapes.

The partition wall 12, which is porous, forms the cells 11 in a partitioned manner. Specifically, the partition wall 12 may be provided within a skin part 14, which is formed in a tubular shape such as a cylindrical shape, to have a certain pattern such as a grid pattern in a cross-sectional view perpendicular to the filter axis direction X. In the exhaust gas purification filter 1, the partition wall 12 and the skin part 14 may each be formed of cordierite, for example. The partition wall 12 may have a thickness of 120 to 360 μm, for example.

The cells 11 include inflow cells 111 into which the exhaust gas G flows and outflow cells 112 out of which the exhaust gas G flows. For example, the inflow cells 111 and the outflow cells 112 may be alternately arranged adjacent to each other in a lateral direction orthogonal to the filter axis direction X and in a longitudinal direction orthogonal to both the filter axis direction X and the lateral direction. In such a case, when the inflow end face 15 or the outflow end face 16 is viewed from the filter axis direction X, the inflow cells 111 and the outflow cells 112 are disposed in a checkerboard pattern, for example. The adjacent inflow and outflow cells 111 and 112 are separated with the partition wall 12 in between.

The inflow-side sealing parts 131 seal openings on the inflow end face 15 side of the outflow cells 112 among the cells 11. On the other hand, the outflow-side sealing parts 132 seal openings on the outflow end face 16 side of the inflow cells 111 among the cells 11. In other words, the inflow cells 111 are each opened on the inflow end face 15 side, while such openings of the cells are closed by the outflow-side sealing parts 132 on the outflow end face 16 side. The outflow cells 112 are each opened on the outflow end face 16 side, while such openings of the cells are closed by the inflow-side sealing parts 131 on the inflow end face 15 side. As shown in FIG. 2, the cells 11 are alternately sealed by the inflow-side sealing parts 131 and the outflow-side sealing parts 132. In the exhaust gas purification filter 1, the inflow-side sealing parts 131 and the outflow-side sealing parts 132 may each be formed of ceramics such as, for example, cordierite, but may be formed of another material.

In the first embodiment, as shown in FIG. 3, the exhaust gas G flows into the inflow cell 111 from the inflow end face 15 being an exhaust gas inflow-side. The exhaust gas G that has flowed into the inflow cell 111 flows within the inflow cell 111 while flowing into the outflow cell 112 through the porous partition wall 12. The exhaust gas G that has entered the outflow cell 112 flows within the outflow cell 112. The exhaust gas G flowing within the outflow cell 112 is then discharged from the outflow end face 16 as an exhaust gas outflow-side.

The partition wall 12 has many pores (not shown). Specifically, the pores in the partition wall 12 include communication holes (not shown) allowing communication between the adjacent inflow and outflow cells 111 and 112. The pores in the partition wall 12 may include non-communication holes (not shown), which do not allow communication between the adjacent inflow and outflow cells 111 and 112, in addition to the communication holes.

In the exhaust gas purification filter 1, the inflow-side sealing part 131 has a smaller porosity than the partition wall 12 has. Specifically, the porosity of the inflow-side sealing part 131 is less than 60%, while the porosity of the partition wall 12 is 60% or more and 70% or less. Pore size $d50_{Pin}$, at which cumulative pore volume is 50% in pore size distribution of the inflow-side sealing parts 131, is smaller than pore size $d50_B$, at which cumulative pore volume is 50% in pore size distribution of the partition wall 12. Specifically, the pore size $d50_{Pin}$ of the inflow-side sealing part 131 is less than 18 μm, and the pore size $d50_B$ of the partition wall 12 is 18 μm or more and 25 μm or less. As a result of satisfying these conditions, density of the inflow-side sealing part 131 is larger than density of the partition wall 12, and thus the inflow-side sealing part 131 has a smaller erosion amount due to scattered matter than the partition wall 12 has. As a result, the exhaust gas purification filter 1 may suppress loss (erosion) of the inflow-side sealing parts 131 due to the scattered matter even if the exhaust gas purification filter 1 is used as a GPF.

If the porosity of the inflow-side sealing part 131 is equal to or more than the porosity of the partition wall 12, if the porosity of the inflow-side sealing part 131 is 60% or more, or if the pore size $d50_{Pin}$ of the inflow-side sealing part 131 is 18 μm or more, the inflow-side sealing part 131 is readily eroded, resulting in a reduction in erosion resistance. The porosity of the inflow-side sealing part 131 may be preferably 58% or less, more preferably 57% or less, further preferably 56% or less, and still further preferably 55% or less from the perspective of suppression of erosion of the inflow-side sealing part 131, for example. The porosity of the inflow-side sealing part 131 is difficult to adjust to 0% in manufacturing. In addition, there is an issue of contraction alignment with the partition wall 12 during calcination (suppression of expansion after calcination of the inflow-side sealing parts 131). From such perspectives, the porosity may be, for example, 50% or more. The pore size $d50_{Pin}$ of the inflow-side sealing part 131 may be preferably 17.5 μm or less, more preferably 17 μm or less, further preferably 16 μm or less, and still further preferably 15 μm or less from the perspective of suppression of erosion of the inflow-side sealing parts 131, for example. In addition, the pore size $d50_{Pin}$ of the inflow-side sealing part 131 may be, for example, 10 μm or more from the perspective of contraction alignment with the partition wall 12 during calcination (suppression of expansion after calcination of the inflow-side sealing parts 131), for example.

The porosity and the pore size $d50_{Pout}$, at which cumulative pore volume is 50% in pore size distribution of the outflow-side sealing parts 132 may be selected from the same or different ranges of the porosity and the pore size $d50_{Pin}$, respectively, of the inflow-side sealing parts 131. In the former case (selection from the same ranges), since the inflow-side sealing parts 131 and the outflow-side sealing parts 132 are likely to be formed of the same material and by the same process, the exhaust gas purification filter 1 having high productivity can be produced.

The porosity of the partition wall 12 of less than 60% makes it difficult to reduce initial pressure loss, leading to a decrease in PM collection performance On the other hand, the porosity of the partition wall 12 of more than 70% makes it difficult to maintain strength of the exhaust gas purification filter 1, leading to an increase in possibility of cracking due to stress applied during casing or due to heat generation during recycling of PM. The porosity of the partition wall 12 may be preferably 61% or more, more preferably 62% or more, and further preferably 63% or more from the perspectives of reducing initial pressure loss and improving PM collection performance. The porosity of the partition wall 12 may be preferably 69% or less, more preferably 68% or less, further preferably 67% or less, and still further preferably 66% or less from the perspective of increasing strength of the exhaust gas purification filter 1, for example.

If the pore size $d50_B$ of the partition wall 12 is less than 18 μm, the porosity of the partition wall 12 tends to be less than 60%. On the other hand, if the pore size $d50_B$ of the partition wall 12 is more than 25 μm, the porosity of the partition wall 12 tends to be more than 70%. The pore size $d50_B$ of the partition wall 12 may be preferably 18.5 μm or more, more preferably 19 μm or more, further preferably 19.5 μm or more, and still further preferably 20 μm or more because the porosity of the partition wall 12 is more likely to be adjusted to 60% or more thereby. The pore size $d50_B$ of the partition wall 12 may be preferably 24 μm or less, more preferably 23 μm or less, further preferably 22 μm or less because the porosity of the partition wall 12 is more likely to be adjusted to 70% or less thereby.

The porosity and pore size $d50_B$ of the partition wall 12 may each be measured by the mercury porosimeter using the principle of the mercury intrusion technique. Specifically, a test piece is cut out from the exhaust gas purification filter 1 except the respective portions having the inflow-side sealing parts 131 and the outflow-side sealing parts 132. The test piece has a rectangular solid shape having a length of 15 mm and a width of 15 mm as dimensions in a direction orthogonal to the filter axis direction X and a length of 20 mm in the filter axis direction X. Subsequently, the test piece is accommodated in a measurement cell of the mercury porosimeter, and the measurement cell is depressurized. After that, mercury is introduced into the measurement cell to pressurize the measurement cell, and pore size and pore volume are respectively measured from pressure of the pressurization and volume of the mercury introduced into the pores of the partition wall 12 in the test piece. The measurement is performed within a pressure range from 0.5 to 20000 psia. Note that 0.5 psia corresponds to $0.35 \times 10^{-3}$ kg/mm², and 20000 psia corresponds to 14 kg/mm². The pore-size range of 0.01 to 420 μm corresponds to such a pressure range. A contact angle 140° and a surface tension 480 dyn/cm are used as constants for calculating the pore size from the pressure. The pore size $d50_B$ of the partition wall 12 means a pore size at which cumulative pore volume is 50% (pore size at an integrated value of pore volume showing 50%). The porosity of the partition wall 12 may be calculated by the following relational expression.

Porosity (%) of partition wall 12=total pore volume/
(total pore volume+1/true specific gravity of
partition wall material)×100

When the partition wall is formed of cordierite, 2.52 may be used as the true specific gravity of the cordierite.

The porosity and pore size $d50_{Pin}$ of the inflow-side sealing part 131 may each be measured by the mercury porosimeter using the principle of the mercury intrusion technique. Specifically, a portion containing the inflow-side sealing part 131 is cut out from the exhaust gas purification filter 1 to have a length of 20 mm in the filter axis direction X from the inflow end face 15. A rectangular solid is further cut out from such a cut piece to have a length of 15 mm and a width of 15 mm as dimensions in a direction orthogonal to the filter axis direction X and a length of 20 mm in the filter axis direction X, and is used as a seal test piece. Subsequently, the seal test piece is accommodated in a measurement cell of the mercury porosimeter, and the measurement cell is depressurized. After that, mercury is introduced into the measurement cell to pressurize the measurement cell, and pore size and pore volume are respectively measured from pressure of the pressurization and volume of the mercury introduced into the pores of the seal test piece. The measurement is performed within a pressure range from 0.5 to 20000 psia. Note that 0.5 psia corresponds to $0.35 \times 10^{-3}$ kg/mm², and 20000 psia corresponds to 14 kg/mm². The pore-size range of 0.01 to 420 μm corresponds to such a pressure range. A contact angle 140° and a surface tension 480 dyn/cm are used as constants for calculating the pore size from the pressure. Although the seal test piece contains part of the partition wall 12, volume of the inflow-side sealing parts 131 is larger than that of the partial partition wall 12 in the seal test piece. Hence, pore size distribution obtained from the seal test piece may be substantially pore size distribution of the inflow-side sealing part 131. Hence, a pore size, at which cumulative pore volume is 50% (pore size at an integrated value of pore volume is 50%) in the pore size distribution obtained from the seal test piece, may be substantially the pore size, at which the cumulative pore volume is 50% (pore size at an integrated value of pore volume is 50%), i.e., the pore size $d50_{Pin}$ of the inflow-side sealing part 131. In addition, the porosity of the seal test piece calculated by the following relational expression may be substantially the porosity of the inflow-side sealing parts 131.

Porosity (%) of seal test piece =total pore volume/
(total pore volume +1/true specific gravity of
sealing material)×100.

When the sealing material is formed of cordierite, 2.52 may be used as the true specific gravity of the cordierite.

The described porosity and pore size $d50_{Pout}$ of the outflow-side sealing parts 132 may be measured in the same manner as the porosity and the pore size $d50_{Pin}$, respectively, of the inflow-side sealing parts 131.

As shown in FIG. 2, the exhaust gas purification filter 1 is configured such that the average of sealing lengths of the inflow-side sealing parts 131 is larger than the average of sealing lengths of the outflow-side sealing parts 132. Such a configuration tends to provide an erosion tolerance before the inflow-side sealing part 131 is scraped and penetrated by the scattered matter. The configuration thus tends to improve durability in the case where the exhaust gas purification filter 1 is used as a GPF, and thus the GPF tends to maintain a PM collection function for a long term.

The average of sealing lengths of the inflow-side sealing parts 131 and the average of sealing lengths of the outflow-side sealing parts 132 are each measured as follows.

Figure 4:
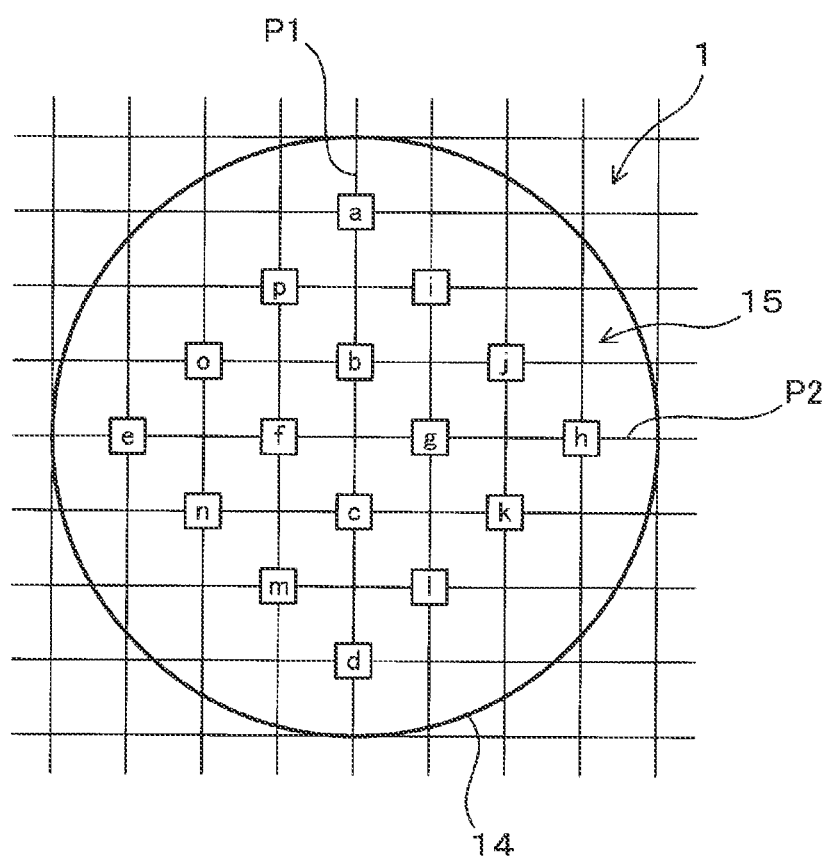
FIG. 4 shows an explanatory drawing of a method for measuring the average of sealing lengths of inflow-side sealing parts and the average of sealing lengths of outflow-side sealing parts of the exhaust gas purification filter of the first embodiment.

FIG. 4 shows the inflow end face 15 of the exhaust gas purification filter 1. In FIG. 4, the cells 11, the partition wall 12, and the inflow-side sealing parts 131 are undepicted. As shown in FIG. 4, first, one straight line P1 is defined with respect to the inflow end face 15 of the exhaust gas purification filter 1 so as to pass through the center of the inflow end face 15. Subsequently, the straight line P1 is rotated clockwise by 90° with the center of the inflow end face 15 to determine a straight line P2. A portion of the straight line P1 clipped by the skin part 14 is divided into eight equal parts. At the seven points dividing the portion of the straight line P1 into eight equal parts, four alternate points as shown in FIG. 4 are defined as measurement points a to d. Similarly, a portion of the straight line P2 clipped by the skin part 14 is divided into eight equal parts. At the seven points dividing the portion of the straight line P2 into eight equal parts, four alternate points as shown in FIG. 4 are defined as measurement points e to h. A line connecting between the measurement points a and h is divided into three equal parts by two points, and the two points are defined as measurement points i and j. Similarly, a line connecting between the measurement points h and d is divided into three equal parts by two points, and the two points are defined as measurement points k and l. A line connecting between the measurement points d and e is divided into three equal parts by two points, and the two points are defined as measurement points m and n. A line connecting between the measurement points e and a is divided into three equal parts by two points, and the two points are defined as measurement points o and p. In this way, 16 measurement points a to p are determined as shown in FIG. 4. To obtain "the average of sealing lengths of the inflow-side sealing parts 131", sixteen outflow cells 112, which exist at positions closest to the respective measurement points a to p, are found. At this time, complete outflow cells 112 are selected. Respective sealing lengths of the inflow-side sealing parts 131 provided in the 16 outflow cells 112 are measured. The average of the resultant 16 sealing lengths is defined as the average of the sealing lengths of the inflow-side sealing parts 131.

Figure 5:
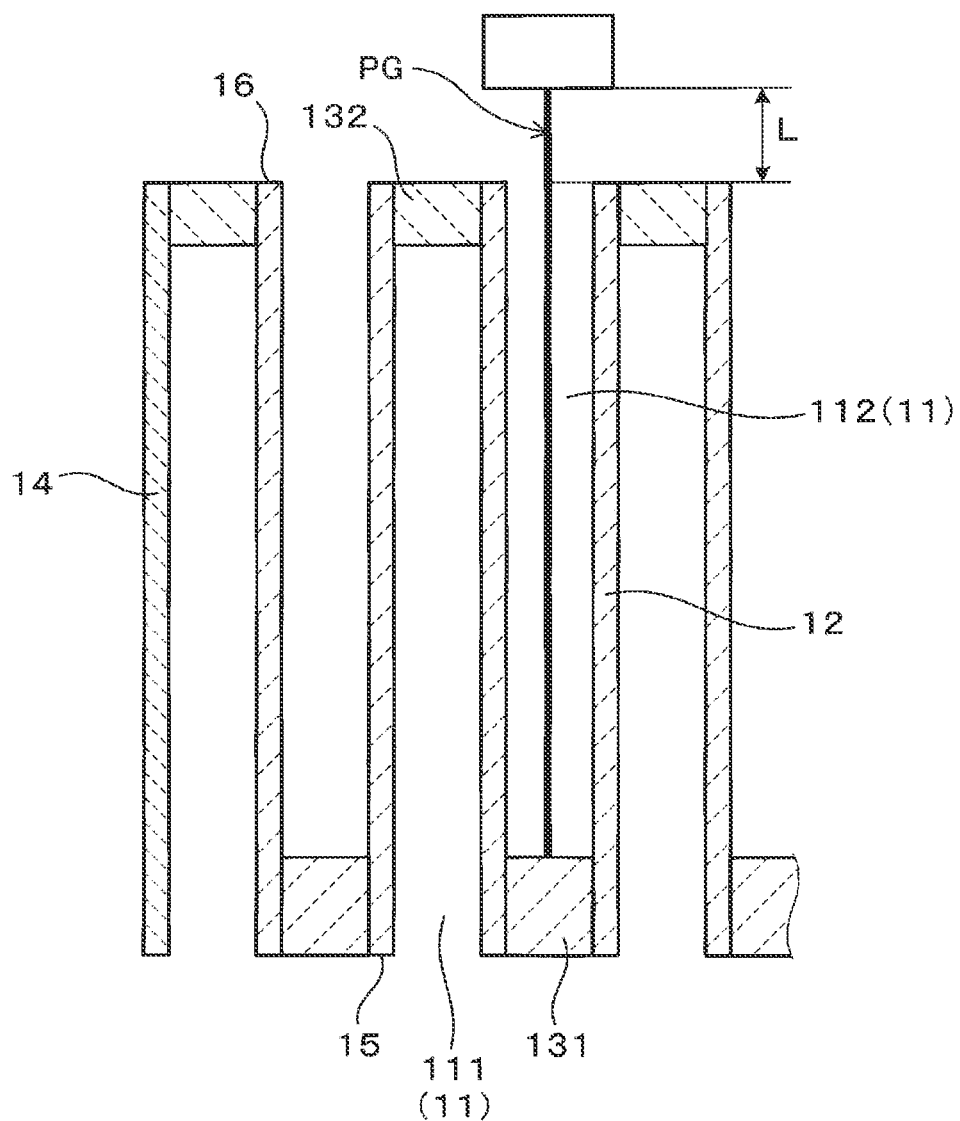
FIG. 5 shows an explanatory drawing of a method for measuring a sealing length of one inflow-side sealing part of the exhaust gas purification filter of the first embodiment.

The sealing length of a first inflow-side sealing part 131 may be measured as follows. First, length from the inflow end face 15 to the outflow end face 16 is measured on the skin part 14 of the exhaust gas purification filter 1, and the resultant length is defined as filter length. Subsequently, the exhaust gas purification filter 1 is disposed with the inflow end face 15 downward and with the outflow end face 16 upward. In other words, the end face having a sealing part to be measured is disposed downward. As shown in FIG. 5, a pin gauge PG matched in length with the filter length is inserted from an opening on the outflow end face 16 side into an outflow cell 112 in which the inflow-side sealing part 131 to be measured is provided. A length L of a portion, projecting outward from the outflow end face 16, of the pin gauge PG is defined as the sealing length of the inflow-side sealing part 131 to be measured. The pin gauge PG is a rod-like measuring instrument made of a durable material. Diameter of the pin gauge PG may be appropriately selected depending on opening size of the cell 11 into which the pin gauge PG is to be inserted.

To obtain the average of sealing lengths of the outflow-side sealing parts 132, sixteen inflow cells 111, which exist at positions closest to the respective measurement points a to p, are found on the outflow end face 16 in the same way as the above. Respective sealing lengths of the outflow-side sealing parts 132 provided in the 16 inflow cells 111 are measured in the same way as the above. The average of the resultant 16 sealing lengths is defined as the average of the sealing lengths of the outflow-side sealing parts 132.

The length of a first outflow-side sealing part 132 is determined in the same way as the sealing length of the inflow-side sealing part 131. That is, a pin gauge PG matched in length with the filter length is inserted from an opening on the inflow end face 15 side into an inflow cell 111 in which the outflow-side sealing part 132 to be measured is provided, and a length L of a portion, projecting outward from the inflow end face 15, of the pin gauge PG is defined as the sealing length of the outflow-side sealing part 132 to be measured.

In the exhaust gas purification filter 1, the total sealing length, which is the sum of the average of the sealing lengths of the inflow-side sealing parts 131 and the average of the sealing lengths of the outflow-side sealing parts 132, is preferably 9 mm or less. Longer total sealing length reduces filtration area length of the partition wall 12, leading to a decrease in PM collection efficiency. In a configuration with the total sealing length within the above range, the reduction in filtration area length of the partition wall 12 can be limited, and thus the decrease in PM collection efficiency is easily suppressed. In particular, when the average of the sealing lengths of the inflow-side sealing parts 131 is larger than the average of the sealing lengths of the outflow-side sealing parts 132, the erosion tolerance increases relative to erosion of the inflow-side sealing parts 131 by the scattered matter, but the filtration area length of the partition wall 12 decreases for a limited filter length. When the average of sealing lengths of the inflow-side sealing parts 131 is larger than the average of sealing lengths of the outflow-side sealing parts 132, and when the total sealing length is 9 mm or less, the reduction in filtration area length of the partition wall 12 is limited, and the decrease in PM collection efficiency is easily suppressed.

The total sealing length may be preferably 8 mm or less, more preferably 7 mm or less, and further preferably 6 mm or less from the perspective of suppressing the decrease in PM collection efficiency. The total sealing length may be preferably 2.5 mm or more, more preferably 3.5 mm or more, and further preferably 4 mm or more from the perspective of easily providing the erosion tolerance of the inflow-side sealing part 131, for example.

The exhaust gas purification filter 1 is disposed and used in an exhaust passage of a gasoline engine, i.e., used as GPF, and thus may sufficiently exhibit its advantages. However, the exhaust gas purification filter 1 may also be disposed and used in an exhaust passage of a diesel engine, i.e., may be used as DPF.

The exhaust gas purification filter 1 may be manufactured as follows, for example.

First, ceramic material powder for forming the partition wall, a binder, a solvent, a pore-forming material to be added as necessary, and an additive to be added as necessary are mixed, and a resultant mixture is formed to produce a honeycomb compact having many through-holes.

The ceramic material powder for forming the partition wall may be appropriately selected in accordance with ceramics forming the partition wall. For example, for aluminum titanate, the ceramic material powder may contain a titanium source such as titania and an aluminum source such as alumina. For cordierite, the ceramic material powder may contain a magnesium source such as magnesia, an aluminum source such as alumina, and a silicon source such as silica. For silicon carbide, the ceramic material powder may contain a carbon source and a silicon source. A blending ratio of each component may be appropriately adjusted to produce desired ceramics. Particle size D50 of the ceramic material powder for forming the partition wall may be 7 to 40 μm. The particle size D50 may be obtained based on volume-based particle size distribution determined by a laser diffraction particle size analyzer (the same hereinafter, and the rest is omitted).

An organic binder may be used as the binder. Examples of the organic binder include: celluloses such as methyl cellulose, carboxymethyl cellulose, hydroxylalkylmethyl cellulose, and sodiumcarboxymethyl cellulose; alcohols such as polyvinyl alcohol; and lignin sulfonate.

The pore-forming material, which is a powder material, is removed from the honeycomb compact through decomposition, combustion, vaporization, or sublimation during calcination, and forms a porous structure within the partition wall. Examples of such pore-forming material include organic powder, carbon powder, and dry ice powder. Examples of the organic powder include starch (potato starch, cone starch, wheat starch, and pea starch), flour, and resin powder. Examples of the resin powder include polyethylene powder and powder of expandable resin (for example, polyethylene resin, polystyrene resin, acrylic resin, and epoxy resin). Examples of the carbon powder include carbon black. Pore size distribution may be controlled by the amount and particle size of the pore-forming material.

Examples of the additive include a lubricant, a plasticizer, and a dispersant.

Examples of the solvent include water and alcohol.

Subsequently, the honeycomb compact is dried as necessary, and an inflow end face of the honeycomb compact is masked to cover inflow cells. Subsequently, an end on a side of the masked inflow end face of the honeycomb compact is immersed in a sealing slurry to fill openings of unmasked outflow cells with the sealing slurry. Subsequently, an outflow end face of the honeycomb compact is masked to cover the outflow cells. Subsequently, an end on a side of the masked outflow end face of the honeycomb compact is immersed in the sealing slurry to fill openings of unmasked inflow cells with the sealing slurry. Subsequently, the sealing slurry filling the openings of the outflow and inflow cells is dried, and thereby sealing formation parts are formed to seal the openings of the cells. At this time, the sealing length of the inflow-side sealing part and the sealing length of the outflow-side sealing part may each be adjusted by immersion time or immersion depth of the honeycomb compact in the sealing slurry. Properties such as viscosity of the sealing slurry to be used may differ between the inflow end face side and the outflow end face side. The ceramic material powder for forming the inflow-side sealing parts and the ceramic material powder for forming the outflow-side sealing parts may be appropriately selected in accordance with ceramics forming the inflow-side sealing parts and ceramics forming the outflow-side sealing parts, respectively, as with the ceramics forming the partition wall. Particle size D50 of the ceramic material powder for forming the inflow-side sealing parts may be 5 to 30 μm. However, the particle size D50 of the ceramic material powder for forming the inflow-side sealing parts is selected to be smaller than the particle size D50 of the ceramic material powder for forming the partition wall. The pore-forming material may be added as necessary.

Subsequently, the resultant honeycomb compact may be calcinated to produce an exhaust gas purification filter. While temperature and atmosphere of the calcination each vary depending on the material, those skilled in the art may select optimum temperature and atmosphere of the calcination for a selected material. For example, when the partition wall is formed of cordierite, the calcination may be performed at 1400 to 1450° C. in atmospheric air.

Experimental Example 1

Production of Exhaust Gas Purification Filter

In experimental example 1, specimens 1 to 24 of exhaust gas purification filters formed of cordierite as shown in later-described Table 1 were prepared according to the above-described method for manufacturing the exhaust gas purification filter. Ceramic material powder for forming a portion (honeycomb base portion) including the partition wall and the skin part, and ceramic material powder for forming the inflow-side sealing parts and the outflow-side sealing parts each contained silica as a Si source, aluminum hydroxide as an Al source, and talc as an Mg source to generate cordierite through calcination. In preparation of each specimen, the particle size D50 of the ceramic material powder for forming the partition wall and the skin part was within a range from 7 to 40 μm. In preparation of the specimens 7, 8, 11, 12, and 17 to 24, the particle size D50 of the ceramic material powder for forming the inflow-side sealing parts and the outflow-side sealing parts was within a range from 5 to 20 μm, and no pore-forming material was added. The particle size D50 of the ceramic material powder for forming the inflow-side sealing parts was smaller than the particle size D50 of the ceramic material powder for forming the partition wall. In preparation of the specimens 1 to 6, 9, 10, and 13 to 16, the particle size D50 of the ceramic material powder for forming the inflow-side sealing parts and the outflow-side sealing parts was within a range from 20 to 45 μm. The particle size D50 of the ceramic material powder for forming the inflow-side sealing parts was equal to or larger than the particle size D50 of the ceramic material powder for forming the partition wall. Further, a pore-forming material 15 to 30 μm in size was added to be 5 to 15 wt % assuming the total amount of the ceramic material powder, the binder, and the solvent was 100 wt %. Spherical carbon having a particle size D50 of 20 μm was used as the pore-forming material.

For each specimen, a honeycomb compact was formed at a calcination temperature of 1440° C. in atmospheric air. Each specimen had a columnar shape having a filter diameter of 118.4 mm and a filter length of 120 mm. Thickness of the partition wall was 8.5 mil, the number of cells was 300 cpsi, and the cell had a rectangular sectional shape. The specimens 1 to 24 were each configured to meet a relationship: the average of sealing lengths of the outflow-side sealing parts<the average of sealing lengths of the inflow-side sealing parts. The set value of the sealing length of the inflow-side sealing part was specifically 2.5 mm.

For each specimen, porosity of the partition wall, pore size $d50_B$ of the partition wall, porosity of the inflow-side sealing part, and pore size $d50_{Pin}$ of the inflow-side sealing part were measured according to the above-described measuring methods. For such measurements, a mercury porosimeter "AutoPore IV 9500" from SHIMADZU CORPORATION was used.

Evaluation of Erosion Resistance of Inflow-Side Sealing Part

Figure 6:
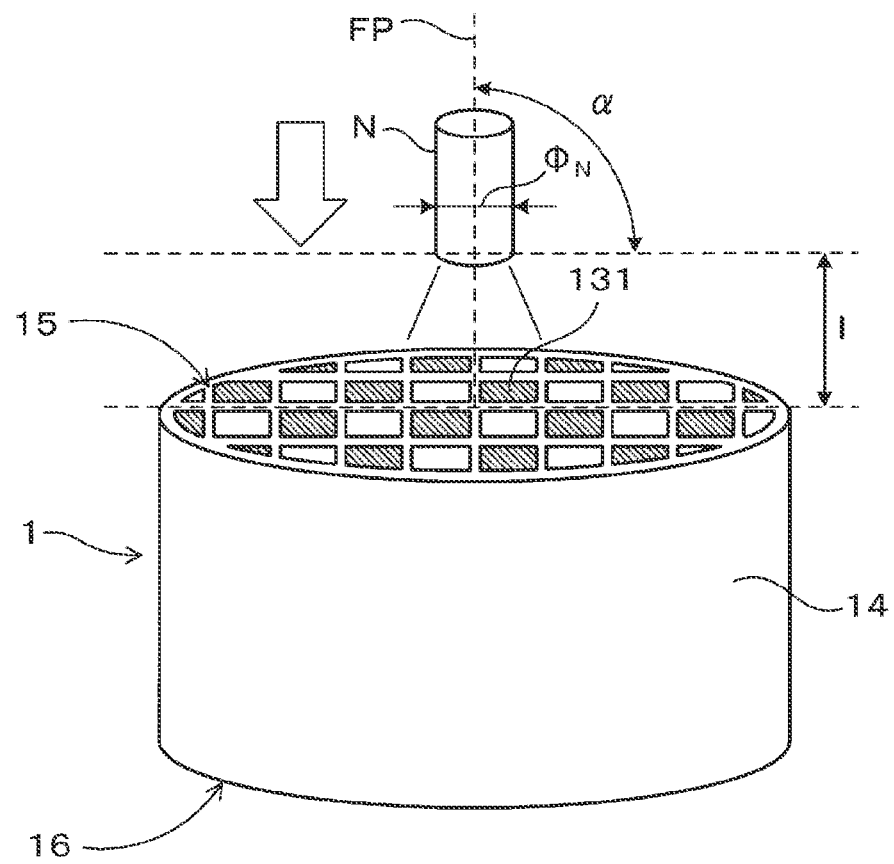
FIG. 6 shows an explanatory drawing of a method for evaluating erosion resistance of inflow-side sealing parts in experimental example 1.

Erosion resistance of the inflow-side sealing part of each specimen was evaluated as follows. Specifically, as shown in FIG. 6, the exhaust gas purification filter 1 of the specimen was disposed with the inflow end face 15 upward. Subsequently, a powder injection nozzle N of a powder injector was disposed on a filter axis FP so as to be orthogonal to the inflow end face 15. In other words, a tilt angle α of the powder injection nozzle N was 90°. The powder injection nozzle N had a nozzle diameter $\Phi_N$ of 8 mm. A distance l between the inflow end face 15 and the outlet of the powder injection nozzle N was 40 mm. Subsequently, silica having a particle size D50 of 8 μm (spherical silica, "HIPRESICA" from UBE EXSYMO CO., LTD.) was loaded as an injecting object into the powder injector. Subsequently, the silica was injected toward the inflow end face 15 at an injection pressure of 20 kPa.

Figure 7:
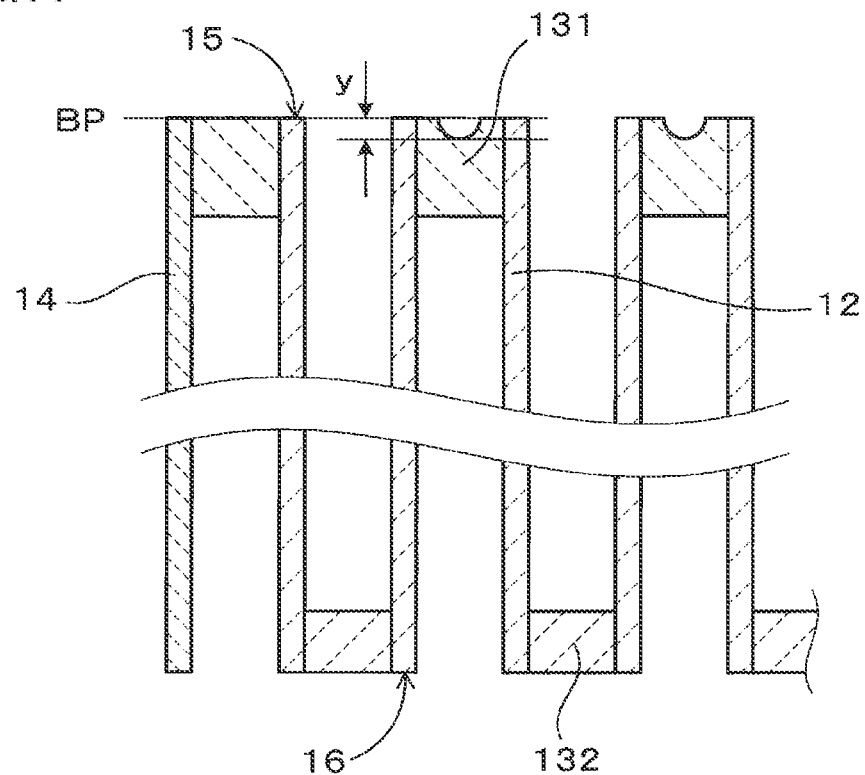
FIG. 7 shows an explanatory drawing of a method for measuring erosion amount of an inflow-side sealing part 131 in the experimental example 1.

After 100 g of the silica was thus injected, the erosion amount of the inflow-side sealing part 131 was measured as follows. Specifically, as shown in FIG. 7, a noncontact laser depth microscope ("OLA4100" from Olympus Corporation) was used to measure depth y of a recess of the inflow-side sealing part 131 caused by inward erosion from a reference surface BP assuming an end face on the inflow end face 15 side of the skin part 14 was the reference surface BP. Measurement was performed on the inflow-side sealing parts 131 at three places, and the average of all the measured recessed depths y was defined as the erosion amount of the inflow-side sealing part 131.

In the experimental example 1, the erosion amount of the inflow-side sealing part of less than 0.75 mm was defined as "A", showing that erosion by the scattered matter was sufficiently suppressed, i.e., showing excellent erosion resistance. The erosion amount of the inflow-side sealing part of 0.75 mm or more and less than 1.0 mm was defined as "B", showing that erosion by the scattered matter was reasonably suppressed, i.e., showing reasonable erosion resistance. The erosion amount of the inflow-side sealing part of 1.0 mm or more was defined as "C", showing that erosion by the scattered matter was not suppressed, i.e., showing poor erosion resistance. The above results are collectively shown in Table 1.

TABLE 1

| Specimen | Partition wall | | Inflow-side sealing part | | Erosion amount of inflow-side sealing part (mm) | Erosion resistance |
|---|---|---|---|---|---|---|
| | Pore (%) | Pore size $d50_B$ (μm) | Porosity (%) | $d50_{Pin}$ (μm) | | |
| 1 | 70 | 25 | 70 | 19 | 2.5 | C |
| 2 | | | 65 | 19 | 1.7 | C |
| 3 | | | 59.5 | 19 | 1.2 | C |
| 4 | | | 55 | 19 | 1.1 | C |
| 5 | | | 70 | 17.5 | 2.2 | C |
| 6 | | | 65 | 17.5 | 1.4 | C |
| 7 | | | 59.5 | 17.5 | 0.85 | B |
| 8 | | | 55 | 17.5 | 0.7 | A |
| 9 | | | 70 | 16 | 1.9 | C |
| 10 | | | 65 | 16 | 1.2 | C |
| 11 | | | 59.5 | 16 | 0.6 | B |
| 12 | | | 55 | 16 | 0.45 | A |
| 13 | 65 | 22 | 65 | 19 | 1.7 | C |
| 14 | | | 59.5 | 19 | 1.2 | C |
| 15 | | | 55 | 19 | 1.1 | C |
| 16 | | | 65 | 17.5 | 1.4 | C |
| 17 | | | 59.5 | 17.5 | 0.85 | B |
| 18 | | | 55 | 17.5 | 0.7 | A |
| 19 | 60 | 18 | 59.5 | 17.5 | 0.85 | B |
| 20 | | | 55 | 17.5 | 0.7 | A |
| 21 | | | 50 | 17.5 | 0.55 | A |
| 22 | | | 59.5 | 16 | 0.6 | A |
| 23 | | | 55 | 16 | 0.45 | A |
| 24 | | | 50 | 16 | 0.3 | A |

As shown in Table 1, the exhaust gas purification filters of the specimens 1 to 6, 9, 10, and 13 to 16 each advantageously have a porosity of the partition wall of 60% or more and 70% or less and have a pore size $d50_B$ of the partition wall of 18 μm or more and 25 μm or less. However, such exhaust gas purification filters each disadvantageously have a porosity of the inflow-side sealing part of 60% or more or have a pore size $d50_{Pin}$ of the inflow-side sealing part of more than 18 μm. Hence, the exhaust gas purification filters each failed to suppress erosion (erosion) of the inflow-side sealing parts due to the scattered matter.

In contrast, the exhaust gas purification filters of the specimens 7, 8, 11, 12, and 17 to 24 each advantageously have a porosity of the inflow-side sealing part of less than 60% and have a porosity of the partition wall of 60% or more and 70% or less. In addition, such exhaust gas purification filters each advantageously have a pore size $d50_{Pin}$ of the inflow-side sealing part of less than 18 μm and have a pore size $d50_B$ of the partition wall of 18 μm or more and 25 μm or less. As a result, the exhaust gas purification filters each successfully suppressed erosion (erosion) of the inflow-side sealing part due to the scattered matter. These results reveal that the exhaust gas purification filters may be preferably used GPFs.

Experimental Example 2

For the exhaust gas purification filter (filter length: 120 mm) of the specimen 17 in the experimental example 1, specimens were prepared to have different total sealing lengths, each of which was the sum of the average of the sealing lengths of the inflow-side sealing parts and the average of the sealing lengths of the outflow-side sealing parts. An increase-and-decrease rate of the PM collection efficiency was obtained for each of the specimens. In the experimental example 2, the relationship: the average of sealing lengths of the outflow-side sealing parts<the average of sealing lengths of the inflow-side sealing parts, was satisfied.

Figure 8:
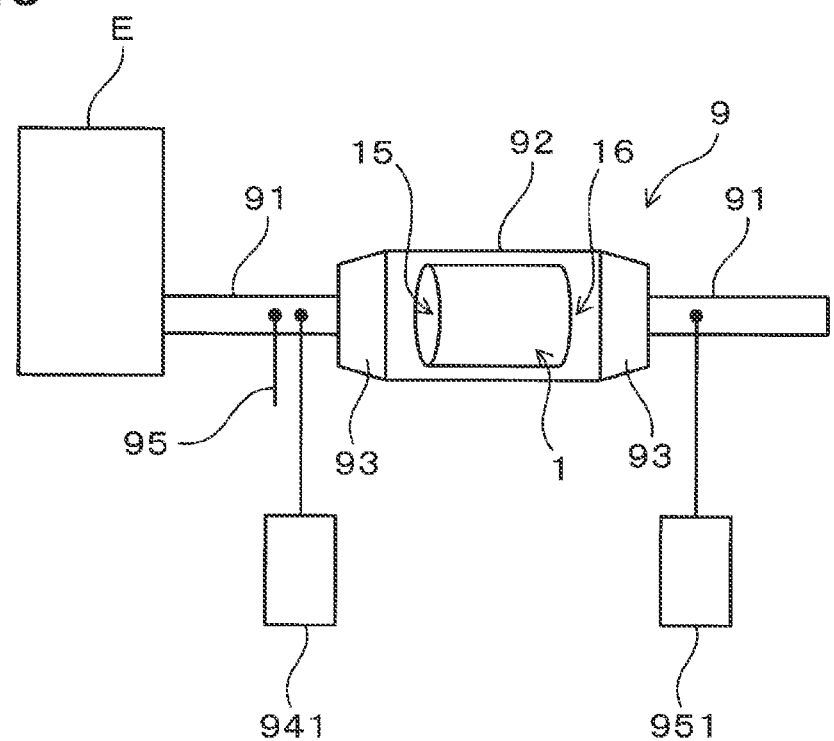
FIG. 8 shows an explanatory drawing of a method for measuring PM collection efficiency in experimental example 2.

The PM collection efficiency was specifically measured as follows. As shown in FIG. 8, there was prepared a test apparatus 9 having a piping part 91, a casing part 92 accommodating the exhaust gas purification filter 1 therein, and a cone part 93 connecting between the piping part 91 and the casing part 92. The piping part 91 on an upstream side of the casing part 92 is connected to an engine E that generates exhaust gas. In the experimental example 2, a direct-injection gasoline engine (displacement 2000 cc, turbo, four-cylinder) was used as the engine E. An upstream-side PM particle counter 941 and a temperature sensor 95 were provided in the piping part 91 on the upstream side of the casing part 92. A downstream-side PM particle counter 951 was provided in the piping part 91 on the downstream side of the casing part 92. A particle counter "AVL-489" from AVL was used as the upstream-side PM particle counter 941 and as the downstream-side PM particle counter 951. The exhaust gas emitted from the direct-injection gasoline engine was supplied to the exhaust gas purification filter. At this time, the number $N_{in}$ of PM in the exhaust gas before flowing into the exhaust gas purification filter and the number $N_{out}$ of PM in the exhaust gas flowing out of the exhaust gas purification filter were measured, and the PM collection efficiency was calculated by a formula $100 \times (1-(N_{in}-N_{out})/N_{in})$. The measurement condition was as follows: temperature of approximately 500° C. and intake air mass of 25 g/sec. The measurement was performed in an initial state where no PM was accumulated in the exhaust gas purification filter.

The PM collection efficiency at the total sealing length, which was the sum of the average of the sealing lengths of the inflow-side sealing parts and the average of the sealing lengths of the outflow-side sealing parts, of 9 mm was defined as a reference, and the increase-and-decrease rate of the PM collection efficiency was calculated by the following formula for each of the total sealing lengths shown in Table 2.

PM collection efficiency increase-and-decrease rate (%)=100×((PM collection efficiency at predetermined total sealing length−PM collection efficiency at total sealing length of 9 mm)/(PM collection efficiency at total sealing length of 9 mm))

The above results are collectively shown in Table 2.

TABLE 2

| Total sealing length (mm) | PM Collection efficiency increase-and-decrease rate (%) |
| --- | --- |
| 1 | +5.6 |
| 2 | +4.9 |
| 3 | +4.2 |
| 4 | +3.5 |
| 5 | +2.8 |
| 6 | +2.1 |
| 7 | +1.4 |
| 8 | +0.7 |
| 9 | Reference |
| 10 | −0.7 |
| 11 | −1.4 |
| 12 | −2.1 |

As shown in Table 2, longer total sealing length decreases filtration area length of the partition wall, and thus decreases the PM collection efficiency. In the total sealing length of 9 mm or less, the decrease in filtration area length of the partition wall can be limited, leading to an increase in PM collection efficiency. These results show that the total sealing length of 9 mm or less allows a decrease in PM collection efficiency to be easily suppressed.

The disclosure should not be limited to the above-described embodiment and experimental examples, and various modifications or alterations thereof may be made within the scope without departing from the gist of the disclosure. The configurations described in the embodiment and the experimental examples may be appropriately combined. Specifically, although the disclosure has been described in accordance with the embodiment, it is understood that the disclosure is not limited to the embodiment or the relevant structures. The disclosure also covers various modifications and variations within the equivalent scope. In addition, various combinations or modes, and other combinations or modes including one additional element, two or more additional elements, or less elements may also be included within the scope of the category or the technical idea of the disclosure.

What is claimed is:

1. An exhaust gas purification filter, comprising:
a plurality of cells each extending from an inflow end face, through which exhaust gas flows in, to an outflow end face, through which the exhaust gas flows out;
a porous partition wall forming the cells in a partitioned manner;
inflow-side sealing parts sealing openings on a side of the inflow end face of outflow cells among the cells, each outflow cell allowing outflow of the exhaust gas from the outflow cell; and
outflow-side sealing parts sealing openings on a side of the outflow end face of inflow cells among the cells, each inflow cell allowing inflow of the exhaust gas to the inflow cell, wherein
an average of sealing lengths of the inflow-side sealing parts is larger than an average of sealing lengths of the outflow-side sealing parts,
each of the inflow-side sealing parts has a porosity of less than 60%, the partition wall has a porosity of 60% or more and 70% or less,
assuming a pore size, at which cumulative pore volume is 50% in pore size distribution of the inflow-side sealing parts, is $d50_{Pin}$, and a pore size, at which cumulative pore volume is 50% in pore size distribution of the partition wall, is $d50_{B}$,
the pore size $d50_{Pin}$ of the inflow-side sealing part is less than 18 μm, and
the pore size $d50_{B}$ of the partition wall is 18 μm or more and 25 μm or less.

2. The exhaust gas purification filter according to claim 1, wherein
a total sealing length which is defined as the sum of the average of sealing lengths of the inflow-side sealing parts and the average of the sealing lengths of the outflow-side sealing parts is 9 mm or less.

3. The exhaust gas purification filter according to claim 1, wherein
the exhaust gas purification filter is configured to be disposed and used in an exhaust passage of a gasoline engine.

4. The exhaust gas purification filter according to claim 2, wherein
the exhaust gas purification filter is configured to be disposed and used in an exhaust passage of a gasoline engine.

5. The exhaust gas purification filter according to claim 1, wherein
   each of the inflow-side sealing parts has a porosity of 50% or more.

6. The exhaust gas purification filter according to claim 1, wherein
   a density of each of the inflow-side sealing parts is larger than a density of the partition wall.

7. The exhaust gas purification filter according to claim 2, wherein
   the total sealing length is 8 mm or less.

8. The exhaust gas purification filter according to claim 2, wherein
   the total sealing length is 2.5 mm or more and 8 mm or less.

* * * * *